US012722122B2

(12) United States Patent
Huang et al.

(10) Patent No.: US 12,722,122 B2
(45) Date of Patent: Sep. 1, 2026

(54) RECIPROCATING CONCENTRATION SYSTEM

(71) Applicant: INDUSTRIAL TECHNOLOGY RESEARCH INSTITUTE, Hsinchu (TW)

(72) Inventors: Hsuan-Yu Huang, Hsinchu City (TW); Jiun-Hua Li, Hsinchu City (TW); Shen-Hua Peng, Taoyuan City (TW); Lih-Tao Hsu, Zhubei City (TW); Wei-Chieh Chang, Zhubei City (TW); Bo-Yi Li, Zhubei City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 357 days.

(21) Appl. No.: 18/626,252

(22) Filed: Apr. 3, 2024

(65) Prior Publication Data

US 2025/0153107 A1 May 15, 2025

(30) Foreign Application Priority Data

Nov. 15, 2023 (TW) ................................ 112144014

(51) Int. Cl.
*B01D 63/02* (2006.01)

(52) U.S. Cl.
CPC .......... *B01D 63/02* (2013.01); *B01D 2313/24* (2013.01); *B01D 2313/26* (2013.01);
(Continued)

(58) Field of Classification Search
None
See application file for complete search history.

(56) References Cited

U.S. PATENT DOCUMENTS 4,814,086 A * 3/1989 Bratt .................... B01D 61/025 210/636
5,034,121 A * 7/1991 Budin ...................... B23H 1/10 210/411
(Continued)

FOREIGN PATENT DOCUMENTS

CN 205349648 U 6/2016
CN 108572104 A 9/2018
(Continued)

OTHER PUBLICATIONS

Weinberger et al., "New technical concept for alternating tangential flow filtration in biotechnological cell separation processes," Biotechnol. Prog.2023;39:e3309. (Year: 2023).*
(Continued)

*Primary Examiner* — Krishnan S Menon
(74) *Attorney, Agent, or Firm* — Maschoff Brennan

(57) ABSTRACT

A reciprocating concentration system includes: a gas output device, first and second liquid accommodating tanks, a selection device, first and second liquid sensors and a computing control device. The gas output device is controlled to output pushing gas through a first gas channel or a second gas channel. The first liquid accommodating tank is in communication with the first gas channel. The second liquid accommodating tank is in communication with the second gas channel. The selection device is in communication with the first liquid accommodating tank and the second liquid accommodating tank through a first liquid channel and a second liquid channel, respectively, and has a filtered liquid outlet. The first liquid sensor and the second liquid sensor are disposed at the first liquid channel and the second liquid channel, respectively. The computing control device is connected to the gas output device and the first and the second liquid sensors.

18 Claims, 8 Drawing Sheets

(52) U.S. Cl.
CPC ...... *B01D 2313/60* (2022.08); *B01D 2313/62* (2022.08); *B01D 2313/701* (2022.08); *B01D 2313/903* (2022.08); *B01D 2315/10* (2013.01); *B01D 2315/14* (2013.01)

(56) References Cited

U.S. PATENT DOCUMENTS

| | | | | |
|---|---|---|---|---|
| 9,623,164 | B2 | 4/2017 | Meyer et al. | |
| 10,174,280 | B2 | 1/2019 | Corso et al. | |
| 10,501,721 | B2 | 12/2019 | Hazlebeck et al. | |
| 10,603,425 | B2 | 3/2020 | Kenley et al. | |
| 11,440,010 | B2 | 9/2022 | Vetter et al. | |
| 12,427,454 | B2 * | 9/2025 | Pavlik | B01D 35/26 |
| 2001/0000895 | A1 * | 5/2001 | Ilias | B01D 61/145 210/321.65 |
| 2010/0105125 | A1 | 4/2010 | Haley, III | |
| 2013/0270165 | A1 * | 10/2013 | Shevitz | B01D 61/58 210/205 |
| 2013/0319944 | A1 * | 12/2013 | Pralong | C12M 47/10 210/257.2 |
| 2015/0164949 | A1 | 6/2015 | Sowemimo-Coker et al. | |
| 2022/0002656 | A1 | 1/2022 | Diel | |
| 2023/0056473 | A1 | 2/2023 | Pepper et al. | |
| 2023/0340399 | A1 | 10/2023 | Hazlebeck et al. | |
| 2024/0375057 | A1 * | 11/2024 | Pedersen | B01D 65/02 |

FOREIGN PATENT DOCUMENTS

| | | | |
|---|---|---|---|
| CN | 115066289 | A | 9/2022 |
| TW | 202100248 | A | 1/2021 |
| TW | I780544 | B | 10/2022 |

OTHER PUBLICATIONS

Saxena, A. et al., “Membrane-based techniques for the separation and purification of proteins: An overview,” Advances in Colloid and Interface Science, vol. 145, pp. 1-22 (2009).
Ter Beek, O.E.M. et al., “In vitro study of dual layer mixed matrix hollow fiber membranes for outside-in filtration of human blood plasma,” Acta Biomaterialia, vol. 123, pp. 244-253 (2021).
Li, A. et al., “Advances in automated cell washing and concentration,” Cytotherapy, vol. 23, pp. 774-786 (2021).
TW Office Action dated Aug. 6, 2024 in application 112144014.

* cited by examiner

RECIPROCATING CONCENTRATION SYSTEM

CROSS-REFERENCE TO RELATED APPLICATIONS

This non-provisional application claims priority under 35 U.S.C. § 119(a) on Patent Application No(s). 112144014 filed in Republic of China (ROC) on Nov. 15, 2023, the entire contents of which are hereby incorporated by reference.

BACKGROUND

1. Technical Field

This disclosure relates to a reciprocating concentration system.

2. Related Art

In cell therapy technology, concentration and purification is a technology that separates target molecules/cells in the process, with the purpose of concentrating and purifying biological samples efficiently, accurately and quickly.

Traditional cell concentration and purification technologies include centrifugation and peristaltic pumps.

SUMMARY

According to one or more embodiment of this disclosure, a reciprocating concentration system includes: a gas output device, a first liquid accommodating tank, a second liquid accommodating tank, a selection device, a first liquid sensor, a second liquid sensor and a computing control device. The gas output device is controlled to output pushing gas through a first gas channel or a second gas channel. The first liquid accommodating tank is in communication with the first gas channel. The second liquid accommodating tank is in communication with the second gas channel. The selection device is in communication with the first liquid accommodating tank through a first liquid channel and is in communication with the second liquid accommodating tank through a second liquid channel, and has a filtered liquid outlet. The first liquid sensor is disposed at the first liquid channel. The second liquid sensor is disposed at the second liquid channel. The computing control device is connected to the gas output device, the first liquid sensor and the second liquid sensor.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
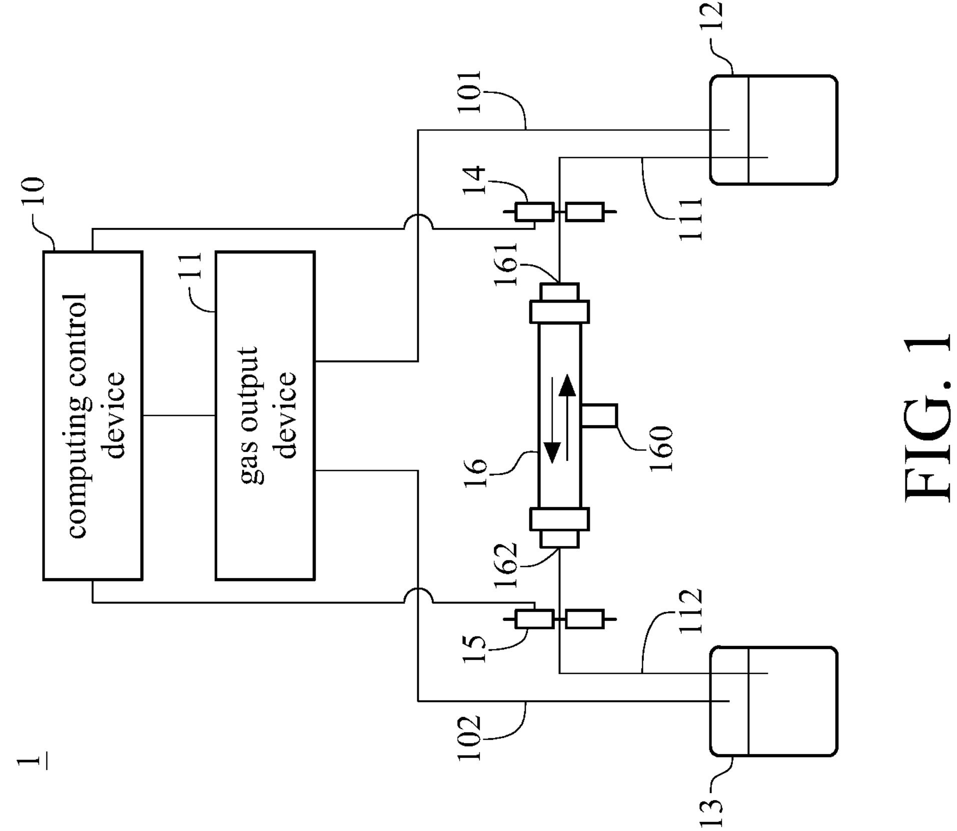
FIG. 1 is a schematic diagram illustrating a reciprocating concentration system according to a first embodiment of the present disclosure.

Please refer to FIG. 1, wherein FIG. 1 is a schematic diagram illustrating a reciprocating concentration system according to a first embodiment of the present disclosure. As shown in FIG. 1, the reciprocating concentration system 1 includes a computing control device 10, a gas output device 11, a first liquid accommodating tank 12, a second liquid accommodating tank 13, a first liquid sensor 14, a second liquid sensor 15 and a selection device 16.

The computing control device 10 is electrically connected to or in signal communication connection with the gas output device 11, the first liquid sensor 14 and the second liquid sensor 15. The computing control device 10 is configured to control the gas output device 11 to output pushing gas through a first gas channel 101 to the first liquid accommodating tank 12, or output the pushing gas through a second gas channel 102 to the second liquid accommodating tank 13. The computing control device 10 may include one or more processors, wherein the processor is, for example, a central processing unit, a graphics processing unit, a microcontroller, a programmable logic controller or any other processor with signal processing functions.

The first liquid sensor 14 is disposed at a first liquid channel 111, and the second liquid sensor 15 is disposed at a second liquid channel 112. The first liquid sensor 14 and the second liquid sensor 15 are configured to sense flowing velocity and/or flow rate etc. of the liquid in the first liquid channel 111 and the second liquid channel 112, respectively. For example, the first liquid sensor 14 and the second liquid sensor 15 may be a photoelectric sensor, a liquid velocity sensor and a flow rate sensor etc.

The selection device 16 has a filtered liquid outlet 160, a first outlet 161 and a second outlet 162. The first outlet 161 of the selection device 16 is in communication with the first liquid channel 111, and the second outlet 162 of the selection device 16 is in communication with the second liquid channel 112. Further, a pore size of the first outlet 161 and a pore size of the second outlet 162 may not be smaller than a diameter of a filtration target, and the pore size of the filtered liquid outlet 160 may be smaller than the diameter of the filtration target. The filtration target is a target substance to be concentrated (e.g., cells). For example, the selection device 16 may be a hollow fiber tube, a spiral wound filter and a flat plate filter etc.

Specifically, when the gas output device 11 outputs the pushing gas to the first liquid accommodating tank 12 through the first gas channel 101, liquid in the first liquid accommodating tank 12 is pushed into the selection device 16 through the first liquid channel 111, the liquid filtered out by the selection device 16 flows out from the filtered liquid outlet 160, and liquid that is not filtered out by the selection device 16 (i.e. the retained liquid) is output from the second outlet 162 of the selection device 16 to the second liquid accommodating tank 13 through the second liquid channel 112. Similarly, when the gas output device 11 outputs the pushing gas to the second liquid accommodating tank 13 through the second gas channel 102, liquid in the second liquid accommodating tank 13 is pushed into the selection device 16 through the second liquid channel 112, the liquid filtered out by the selection device 16 flows out from the filtered liquid outlet 160, and liquid that is not filtered out by the selection device 16 (i.e. the retained liquid) is output from the first outlet 161 of the selection device 16 to the first liquid accommodating tank 12 through the first liquid channel 111.

Furthermore, the computing control device 10 is configured to control the gas output device 11 to output the pushing gas through one of the first gas channel 101 and the second gas channel 102, obtain the sensing value of the corresponding one of the first liquid sensor 14 and the second liquid sensor 15, and control the gas output device 11 to output the pushing gas through another one of the first gas channel 101 and the second gas channel 102 when the sensing value of the corresponding one of the first liquid sensor 14 and the second liquid sensor 15 decreases to a default value. The default value may be 0, but the present disclosure is not limited thereto.

According to the structure of the reciprocating concentration system 1 shown in FIG. 1, liquid may pass through the selection device 16 reciprocally to be continuously concentrated and filtered, and the liquid may be driven to the selection device 16 more smoothly and at a uniform speed by the pushing gas. Accordingly, when the reciprocating concentration system 1 is applied to relatively fragile filtration target (e.g., cells), the shearing force and damage to the filtration target may be reduced.

Figure 2:
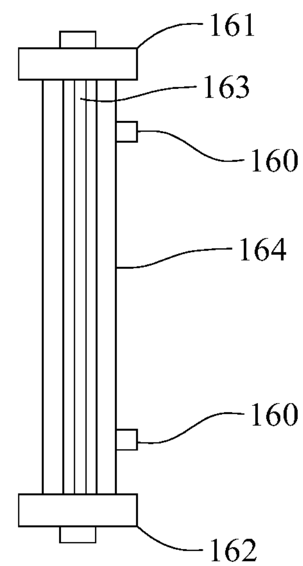
FIG. 2 is a schematic diagram illustrating a hollow fiber tube according to an embodiment of the present disclosure.
Figure 3:
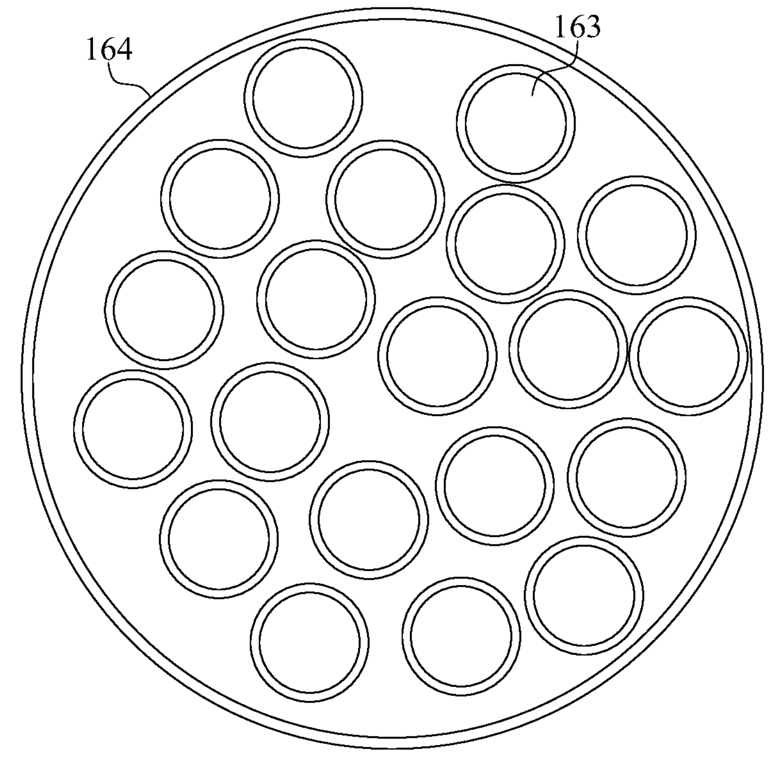
FIG. 3 is a sectional view of a hollow fiber tube according to an embodiment of the present disclosure.

Please refer to FIG. 2 and FIG. 3, wherein FIG. 2 is a schematic diagram illustrating a hollow fiber tube according to an embodiment of the present disclosure, and FIG. 3 is a sectional view of a hollow fiber tube according to an embodiment of the present disclosure. As shown in FIG. 2 and FIG. 3, when the selection device 16 is the hollow fiber tube, the selection device 16 includes filtered liquid outlets 160, a first outlet 161, a second outlet 162, a plurality of hollow fiber membranes 163 and a shell 164. It should be noted that FIG. 2 illustrates the selection device 16 as having two filtered liquid outlets 160, but the number of the filtered liquid outlet 160 of the selection device 16 may also be one (as shown in FIG. 1) or more than two, the present disclosure does not limit the number of the filtered liquid outlet 160.

As described above, the first outlet 161 is in communication with the first liquid accommodating tank 12 through the first liquid channel 111, and the second outlet 162 is in communication with the second liquid accommodating tank 13 through the second liquid channel 112. The filtered liquid outlets 160 are configured to output the filtered liquid. The hollow fiber membranes 163 are located inside the shell 164, and the membrane pore size (i.e. the pore size of the pores on the wall of the hollow fiber membranes 163) of each one of the hollow fiber membranes 163 in communication with the filtered liquid outlet 160 may be larger than or smaller than the diameter of the filtration target (e.g., cells). Specifically, when the reciprocating concentration system 1 is configured to collect the filtration target, the membrane pore size of each one of the hollow fiber membranes 163 may be smaller than the diameter of the filtration target to collect the filtration target flowing out from the first outlet 161 or the second outlet 162. In addition, when the reciprocating concentration system 1 is configured to collect the filtration target, the membrane pore size of each one of the hollow fiber membranes 163 may also be larger than the diameter of the filtration target to collect the filtration target flowing out from the filtered liquid outlets 160. Accordingly, the concentrated filtration target may flow into the first liquid accommodating tank 12 through the first outlet 161 and flow into the second liquid accommodating tank 13 through the second outlet 162, and the filtered out liquid may be discharged through the filtered liquid outlets 160.

Figure 4:
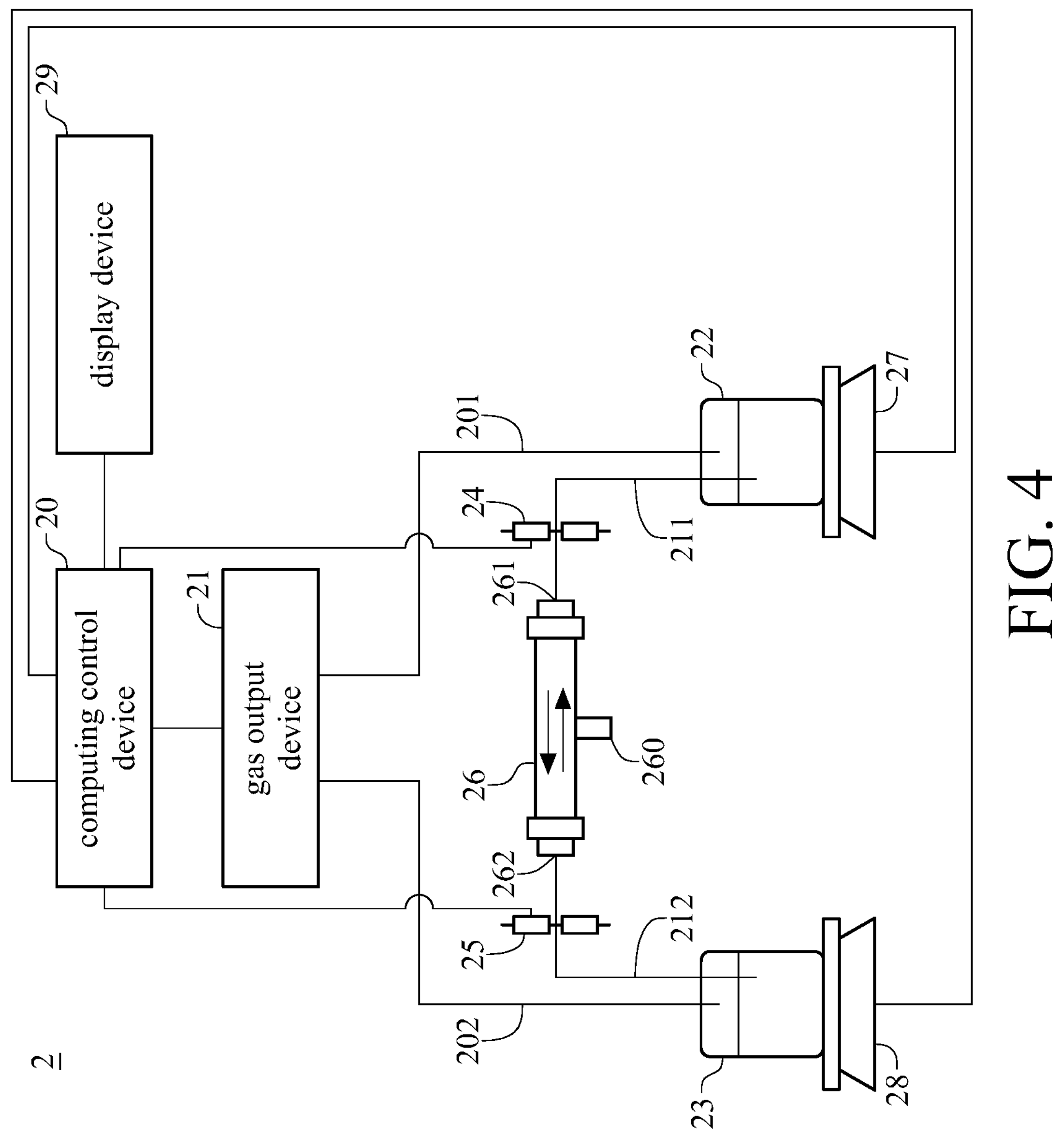
FIG. 4 is a schematic diagram illustrating a reciprocating concentration system according to a second embodiment of the present disclosure.

Please refer to FIG. 4, wherein FIG. 4 is a schematic diagram illustrating a reciprocating concentration system according to a second embodiment of the present disclosure. As shown in FIG. 4, the reciprocating concentration system 2 includes a computing control device 20, a gas output device 21, a first liquid accommodating tank 22, a second liquid accommodating tank 23, a first liquid sensor 24, a second liquid sensor 25, a selection device 26, a first content sensor 27, a second content sensor 28 and a display device 29.

The computing control device 20 is electrically connected to or in signal communication connection with the gas output device 21, the first liquid sensor 24, the second liquid sensor 25, the first content sensor 27, the second content sensor 28 and the display device 29. The computing control device 20 is configured to control the gas output device 21 to output the pushing gas to the first liquid accommodating tank 22 through the first gas channel 201, or to output the pushing gas to the second liquid accommodating tank 23 through the second gas channel 202. The first liquid sensor 24 is disposed at the first liquid channel 211, and the second liquid sensor 25 is disposed at the second liquid channel 212.

The implementations of the computing control device 20, the gas output device 21, the first liquid accommodating tank 22, the second liquid accommodating tank 23, the first liquid sensor 24, the second liquid sensor 25 and the selection device 26 of the reciprocating concentration system 2 are the same as the implementations of the computing control device 10, the gas output device 11, the first liquid accommodating tank 12, the second liquid accommodating tank 13, the first liquid sensor 14, the second liquid sensor 15 and the selection device 16 of FIG. 1, their descriptions are not repeated herein.

The first content sensor 27 is disposed at the first liquid accommodating tank 22, and the second content sensor 28 is disposed at the second liquid accommodating tank 23. FIG. 4 illustrates the first content sensor 27 and the second content sensor 28 as weight sensors, but the first content sensor 27 and the second content sensor 28 may also be concentration sensors or volume sensors disposed inside or outside of the first liquid accommodating tank 22 and the second liquid accommodating tank 23. The computing control device 20 may obtain the sensing values of the first content sensor 27 and the second content sensor 28, and control the gas output device 21 to stop outputting the pushing gas when one of the sensing values is equal to or higher than a target value. The target value depends on the liquid to be concentrated, the present disclosure is not limited thereto.

For example, when the computing control device 20 determines that the sensing value of the first content sensor 27 or the sensing value of the second content sensor 28 is equal to or higher than the target value, it means that the concentration process is complete. Therefore, the computing control device 20 may control the gas output device 21 to stop outputting the pushing gas.

In addition, in the embodiment where the first content sensor 27 and the second content sensor 28 are weight sensors, the computing control device 20 may further output a channel switching signal to the gas output device 21 when determining that the sensing value of the first content sensor 27 or the sensing value of the second content sensor 28 is lower than a lower limit, wherein the channel switching signal is configured to instruct the gas output device 21 to stop outputting the pushing gas through the original gas channel, and start outputting the pushing gas through another gas channel. The lower limit depends on the liquid to be concentrated, and may be a user-defined value, and the lower limit is greater than 0. Take the first content sensor 27 as an example, when the computing control device 20 determines that the sensing value of the first content sensor 27 is lower than the lower limit, it means that the liquid in the first liquid accommodating tank 22 is transferred to the second liquid accommodating tank 23 and the filtered liquid outlet 260, and the liquid in the second liquid accommodating tank 23 has been transferred back to the first liquid accommodating tank 22 from the selection device 26. At this time, the computing control device 20 may output the channel switching signal to the gas output device 21 before the liquid in the first liquid accommodating tank 22 is completely output to the second liquid accommodating tank 23 through the selection device 26, so that the gas output device 21 switches to output the pushing gas to the second gas channel 202. Through this mechanism, the problem that the weight of the finally collected concentrated liquid cannot reach the target value (target weight) due to excessive liquid being output by the selection device 26 through the filtered liquid outlet 260 during the reciprocating concentration process may be avoided. Based on the sensing value of the first content sensor 27, the computing control device 20 may determine that the liquid in the first liquid accommodating tank 22 is not yet completely output to the second liquid accommodating tank 23 through the selection device 26.

In addition, the computing control device 20 may further control the display device 29 to display a replacement notification corresponding to the selection device 26 when a filtration rate indicated by a plurality of sensing values of at least one of the first liquid sensor 24 and the second liquid sensor 25 is lower than a default rate. Take the first liquid sensor 24 as an example, the computing control device 20 may read each one of a series of sensing values from the first liquid sensor 24. When the sensing values exhibit a decreasing trend, it means that the filtration capability of the selection device 26 might already deteriorate. Therefore, the computing control device 20 may control the display device 29 to display the replacement notification to notify the user to replace the selection device 26. For example, the computing control device 20 may subtract the sensing value corresponding to the earlier time point from the sensing value corresponding to the later time point, and use the resulting difference as the filtration rate. The computing control device 20 may control the display device 29 to display the replacement notification when the filtration rate is lower than a default rate.

In addition, FIG. 4 shows that the reciprocating concentration system 2 includes the first content sensor 27, the second content sensor 28 and the display device 29, but the reciprocating concentration system 2 may also not include the first content sensor 27 and the second content sensor 28 and include the display device 29, or the reciprocating concentration system 2 may not include the display device 29 and include the first content sensor 27 and the second content sensor 28.

Figure 5:
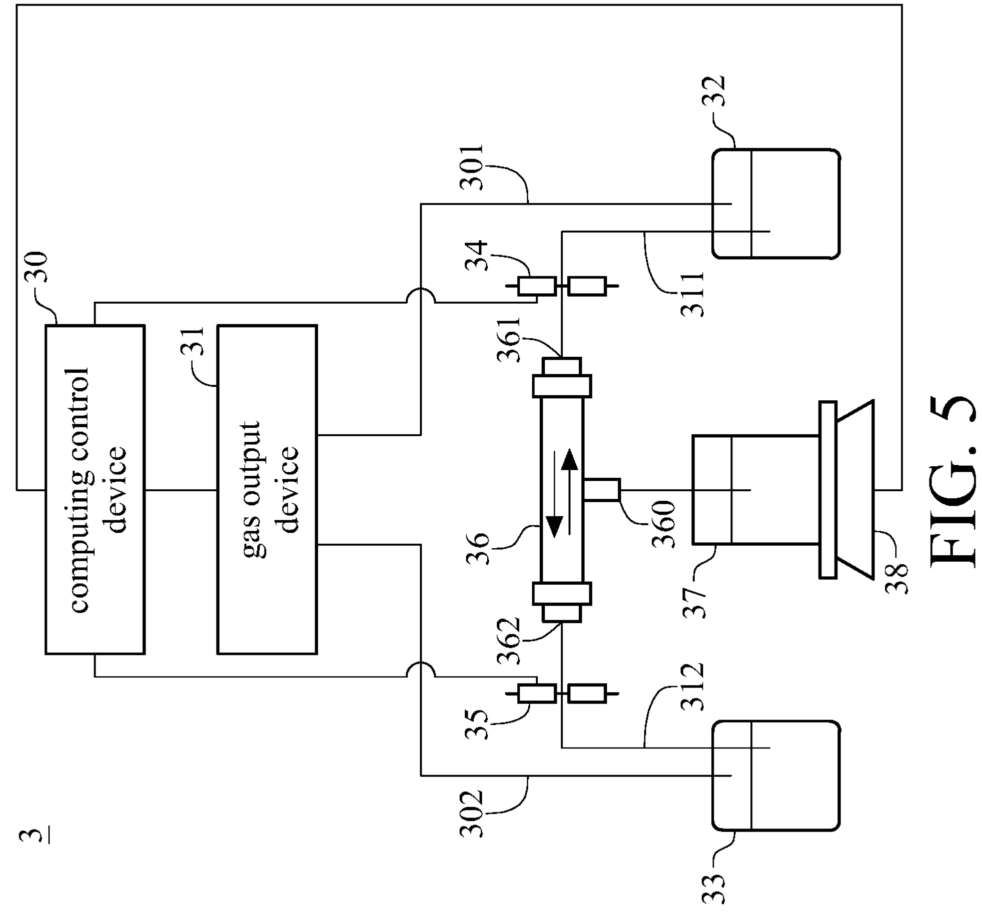
FIG. 5 is a schematic diagram illustrating a reciprocating concentration system according to a third embodiment of the present disclosure.

Please refer to FIG. 5, wherein FIG. 5 is a schematic diagram illustrating a reciprocating concentration system according to a third embodiment of the present disclosure. As shown in FIG. 5, the reciprocating concentration system 3 includes a computing control device 30, a gas output device 31, a first liquid accommodating tank 32, a second liquid accommodating tank 33, a first liquid sensor 34, a second liquid sensor 35, a selection device 36, a third liquid accommodating tank 37 and a content sensor 38.

The computing control device 30 is electrically connected to or in signal communication connection with the gas output device 31, the first liquid sensor 34, the second liquid sensor 35 and the content sensor 38. The computing control device 30 is configured to control the gas output device 31 to output the pushing gas to the first liquid accommodating tank 32 through the first gas channel 301, and output the pushing gas to the second liquid accommodating tank 33 through the second gas channel 302. The first liquid sensor 34 is disposed at the first liquid channel 311, and the second liquid sensor 35 is disposed at the second liquid channel 312.

The implementations of the computing control device 30, the gas output device 31, the first liquid accommodating tank 32, the second liquid accommodating tank 33, the first liquid sensor 34, the second liquid sensor 35 and the selection device 36 of the reciprocating concentration system 3 may be the same as the implementations of the computing control device 10, the gas output device 11, the first liquid accommodating tank 12, the second liquid accommodating tank 13, the first liquid sensor 14, the second liquid sensor 15 and the selection device 16 of FIG. 1, their descriptions are not repeated herein.

The third liquid accommodating tank 37 is disposed at the filtered liquid outlet 360 and may be configured to store liquid output from the filtered liquid outlet 360. FIG. 5 illustrates the content sensor 38 as the weight sensor, but the content sensor 38 may also be a concentration sensor disposed inside the third liquid accommodating tank 37.

Moreover, in the embodiment of FIG. 5, the reciprocating concentration system 3 may be configured to purify liquid in the first liquid accommodating tank 32/the second liquid accommodating tank 33, and the third liquid accommodating tank 37 is configured to collect the purified liquid output from the filtered liquid outlet 360 of the selection device 36. Therefore, when the content sensor 38 is the weight sensor, the computing control device 30 may control the gas output device 31 to stop outputting the pushing gas when the sensing value of the content sensor 38 is higher than a first target value.

The reciprocating concentration system 3 may further include a transmittance sensor, and the computing control device 30 is configured to control the gas output device 31 to stop outputting the pushing gas when the sensing value of the content sensor 38 is higher than a first target value and the sensing value of the transmittance sensor is higher than a second target value. In other words, when the sensing value of the content sensor 38 and the sensing value of the transmittance sensor are higher than the respective target value, it means that enough purified liquid is collected in the third liquid accommodating tank 37.

The reciprocating concentration system 3 may further include the concentration sensor, and the computing control device 30 is configured to control the gas output device 31 to stop outputting the pushing gas when the sensing value of the content sensor 38 (the weight sensor) is higher than the first target value and the sensing value of the concentration sensor is lower than a third target value. In other words, when the sensing value of the content sensor 38 is higher than the first target value and the sensing value of the concentration sensor is lower than the third target value, it means that enough purified liquid is collected in the third liquid accommodating tank 37. The first target value, the second target value and the third target value depend on the liquid to be concentrated, and may be a user-defined value, the present disclosure is not limited thereto.

Figure 6:
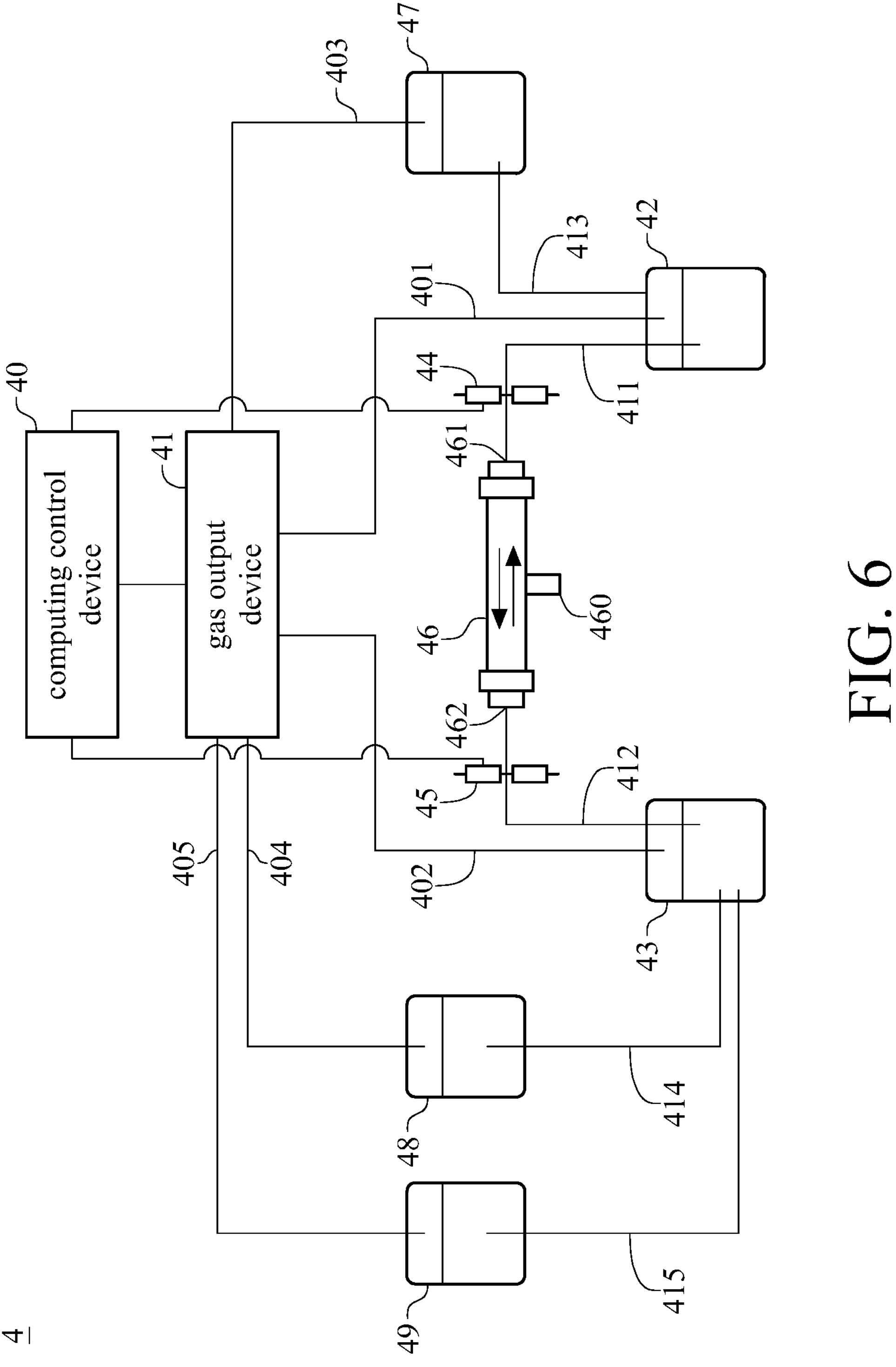
FIG. 6 is a schematic diagram illustrating a reciprocating concentration system according to a fourth embodiment of the present disclosure.

Please refer to FIG. 6, wherein FIG. 6 is a schematic diagram illustrating a reciprocating concentration system according to a fourth embodiment of the present disclosure. As shown in FIG. 6, the reciprocating concentration system 4 includes a computing control device 40, a gas output device 41, a first liquid accommodating tank 42, a second liquid accommodating tank 43, a first liquid sensor 44, a second liquid sensor 45, a selection device 46, a first liquid storage tank 47 and a second liquid storage tank 48.

The computing control device 40 is electrically connected to or in signal communication connection with the gas output device 41, the first liquid sensor 44 and the second liquid sensor 45. The computing control device 40 is configured to control the gas output device 41 to output the pushing gas to the first liquid accommodating tank 42 through the first gas channel 401, or to control the gas output device 41 to output the pushing gas to the second liquid accommodating tank 43 through the second gas channel 402. The first liquid sensor 44 is disposed at the first liquid channel 411, and the second liquid sensor 45 is disposed at the second liquid channel 412.

The implementations of the computing control device 40, the gas output device 41, the first liquid accommodating tank 42, the second liquid accommodating tank 43, the first liquid sensor 44, the second liquid sensor 45 and the selection device 46 of the reciprocating concentration system 4 may be the same as the implementations of the computing control device 10, the gas output device 11, the first liquid accommodating tank 12, the second liquid accommodating tank 13, the first liquid sensor 14, the second liquid sensor 15 and the selection device 16 of FIG. 1, their descriptions are not repeated herein.

The gas output device 41 is further in communication with the first liquid storage tank 47 through a third gas channel 403, and the first liquid storage tank 47 is in communication with the first liquid accommodating tank 42 through the third liquid channel 413. Take cell extraction as an example, the first liquid storage tank 47 may be configured to store the unfiltered cell solution. Therefore, before the computing control device 40 controlling the gas output device 41 to output the pushing gas through the first gas channel 401 and the second gas channel 402, the computing control device 40 may first control the gas output device 41 to output the pushing gas to the first liquid storage tank 47 through the third gas channel 403, so that liquid in the first liquid storage tank 47 is pushed into the first liquid accommodating tank 42 by the pushing gas output by the third gas channel 403.

When the liquid originally stored in the first liquid storage tank 47 completely enters the first liquid accommodating tank 42 and/or the weight of the first liquid accommodating tank 42 is equal to or higher than a default weight, the computing control device 40 may then control the gas output device 41 to output the pushing gas to the first liquid accommodating tank 42 through the first gas channel 401, thereby performing the reciprocating concentration through the first gas channel 401 and the second gas channel 402. Also, the process of first inputting the liquid in the first liquid storage tank 47 into the first liquid accommodating tank 42 then performing the reciprocating concentration may be repeated for multiple times.

The gas output device 41 is further in communication with the second liquid storage tank 48 through a fourth gas channel 404, and the second liquid storage tank 48 is in communication with the second liquid accommodating tank 43 through a fourth liquid channel 414. Take cell extraction for example, the second liquid storage tank 48 may store washing solution, buffering solution or reagents for washing/processing the concentrated cell solution. Therefore, after the computing control device 40 controlling the gas output device 41 to stop outputting the pushing gas through the first gas channel 401 and the second gas channel 402, the computing control device 40 controls the gas output device 41 to output the pushing gas to the second liquid storage tank 48 through the fourth gas channel 404, so that the liquid stored in the second liquid storage tank 48 is pushed into the second liquid accommodating tank 43 by the pushing gas output by the fourth liquid channel 414.

When all the liquid in the second liquid storage tank 48 flows into the second liquid accommodating tank 43, the weight of the second liquid accommodating tank 43 is equal to or higher than a default weight and/or the liquid concentration of the second liquid accommodating tank 43 is diluted to a corresponding default concentration by the liquid in the second liquid storage tank 48, the computing control device 40 may then again control the gas output device 41 to output the pushing gas to the second liquid accommodating tank 43 through the second gas channel 402, thereby performing the reciprocating concentration again by the first gas channel 401 and the second gas channel 402. Also, the process of first inputting the liquid in the second liquid storage tank 48 into the second liquid accommodating tank 43 then performing the reciprocating concentration may be repeated for multiple times.

In addition, the reciprocating concentration system 4 may further include a third liquid storage tank 49. For example, the second liquid storage tank 48 is configured to store reagent solution, and the third liquid storage tank 49 is configured to store the washing solution. The second liquid storage tank 48 and the third liquid storage tank 49 are in communication with the gas output device 41 through the fourth gas channel 404 and a fifth gas channel 405, respectively. Therefore, after repeating the process of inputting the reagent solution in the second liquid storage tank 48 into the second liquid accommodating tank 43 and then performing the reciprocating concentration for multiple times as described above, the computing control device 40 may control the gas output device 41 to output the pushing gas through the gas channel in communication with the third liquid storage tank 49, so that the washing solution stored in the third liquid storage tank 49 is output to the second liquid accommodating tank 43 through the corresponding liquid channel. When all the liquid in the third liquid storage tank 49 has entered the second liquid accommodating tank 43, the weight of the second liquid accommodating tank 43 is equal to or higher that a default weight and/or the liquid concentration of the second liquid accommodating tank 43 is diluted to a corresponding default concentration by the liquid in the third liquid storage tank 49, the computing control device 40 may then again control the gas output device 41 to output the pushing gas to the second liquid accommodating tank 43 through the second gas channel 402, thereby performing the reciprocating concentration again by the first gas channel 401 and the second gas channel 402.

The weight/concentration of the first liquid accommodating tank 42 and the second liquid accommodating tank 43 may be obtained through the first content sensor 27 and the second content sensor 28 of FIG. 4, their descriptions are not repeated herein.

Figure 7:
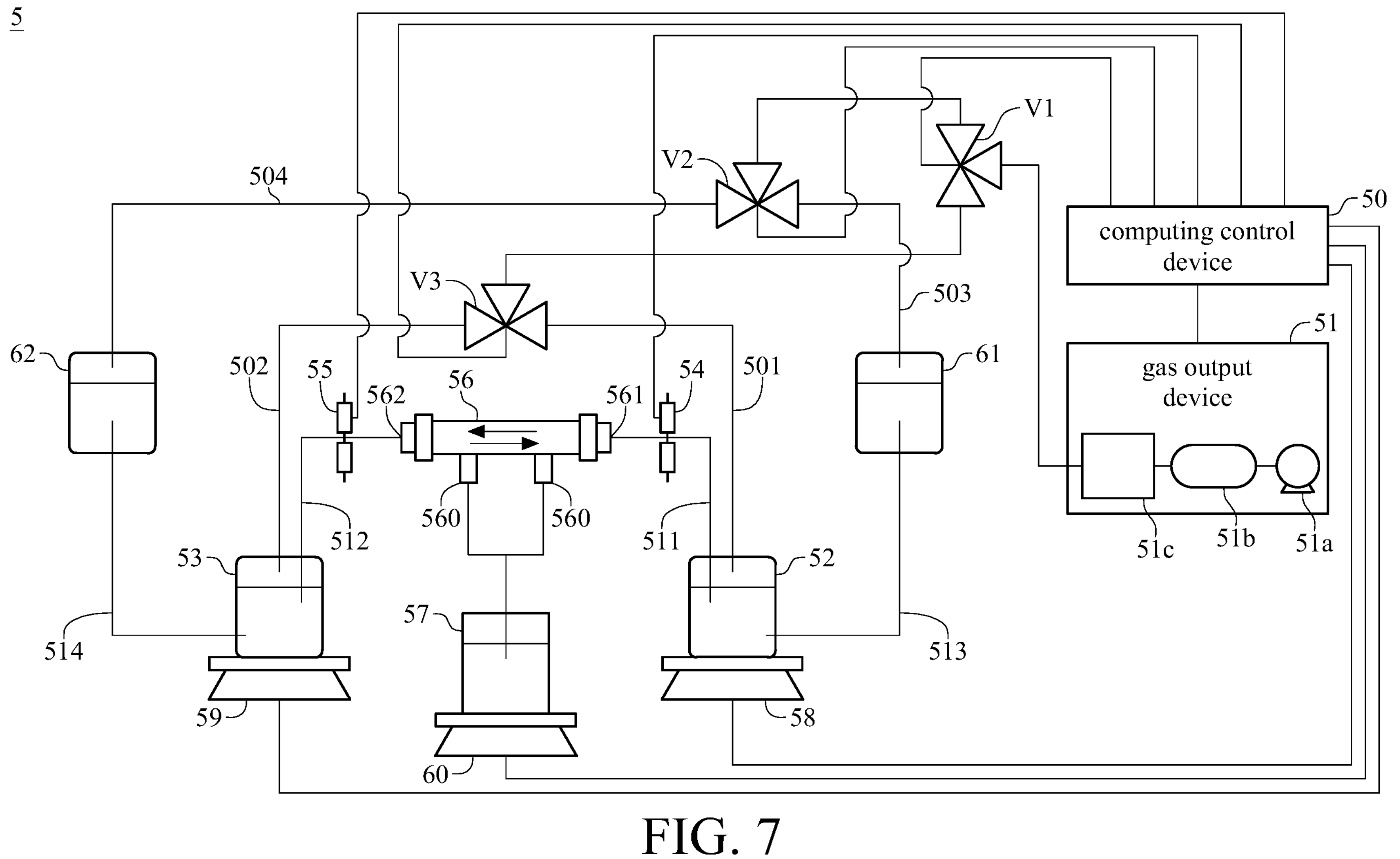
FIG. 7 is a schematic diagram illustrating a reciprocating concentration system according to a fifth embodiment of the present disclosure.

Please refer to FIG. 7, wherein FIG. 7 is a schematic diagram illustrating a reciprocating concentration system according to a fifth embodiment of the present disclosure. As shown in FIG. 7, the reciprocating concentration system 5 includes a computing control device 50, a gas output device 51, a first liquid accommodating tank 52, a second liquid accommodating tank 53, a first liquid sensor 54, a second liquid sensor 55, a selection device 56, a third liquid accommodating tank 57, a first content sensor 58, a second content sensor 59, a third content sensor 60, a first liquid storage tank 61, a second liquid storage tank 62, a first valve V1, a second valve V2 and a third valve V3. The first valve V1 is disposed at the outlet of the gas output device 51 and is connected to the second valve V2 and the third valve V3. The second valve V2 is connected to the air inlet of the first liquid storage tank 61 and the air inlet of the second liquid storage tank 62. The third valve V3 is connected to the first liquid accommodating tank 52 and the second liquid accommodating tank 53 (i.e. connected to the first gas channel 501 and the second gas channel 502). Each of the first valve V1, the second valve V2 and the third valve V3 may be implemented by a three-way solenoid valve.

The computing control device 50 is electrically connected to or in signal communication connection with the gas output device 51, the first liquid sensor 54, the second liquid sensor 55, the first content sensor 58, the second content sensor 59 and the third content sensor 60. In addition, the computing control device 50 may be electrically connected to the first valve V1, the second valve V2 and the third valve V3 to control the status of the first valve V1, the second valve V2 and the third valve V3. The computing control device 50 is configured to control the gas output device 51 to output the pushing gas to the first liquid accommodating tank 52 through the first gas channel 501, or to output the pushing gas to the second liquid accommodating tank 53 through the second gas channel 502. The first liquid sensor 54 is disposed at the first liquid channel 511, and the second liquid sensor 55 is disposed at the second liquid channel 512.

The implementations of the computing control device 50, the first liquid accommodating tank 52, the second liquid accommodating tank 53, the first liquid sensor 54, the second liquid sensor 55 and the selection device 56 of the reciprocating concentration system 5 may be the same as the implementations of the computing control device 10, the first liquid accommodating tank 12, the second liquid accommodating tank 13, the first liquid sensor 14, the second liquid sensor 15 and the selection device 16 of the reciprocating concentration system 1, respectively. The implementations of the third liquid accommodating tank 57 and the third content sensor 60 may be the same as the implementations of the third liquid accommodating tank 37 and the content sensor 38 of FIG. 5, respectively. The implementations of the first liquid storage tank 61 and the second liquid storage tank 62 may be the same as the implementations of the first liquid storage tank 47 and the second liquid storage tank 48 of FIG. 6, respectively.

The gas output device 51 may include a pump 51*a*, a gas storage tank 51*b* and a gas pressure controller 51*c*. The pump 51*a* is connected to the gas storage tank 51*b*, and the gas storage tank 51*b* is connected to the gas pressure controller 51*c*. The pump 51*a* may be controlled by the computing control device 50 to apply pressure to the gas storage tank 51*b*, and the gas in the gas storage tank 51*b* is output to the gas pressure controller 51*c* by the pressure applied by the pump 51*a*. The gas pressure controller 51*c* is configured to modulate the pressure of the pushing gas output by the gas output device 51 to the first valve V1. For example, the gas pressure controller 51*c* may include a microcontroller and a pressure regulator valve. For example, the first liquid accommodating tank 52 and the second liquid accommodating tank 53 may each be disposed with a gas sensor, and the two gas sensors are connected to the computing control device 50. The computing control device 50 regulate the pressure of the pushing gas output by the gas output device 51 according to the sensing values of the two gas sensors. During the process, the computing control device 50 may output a control signal to the microcontroller of the gas pressure controller 51*c* according to the required pressure for the pushing gas, and the microcontroller outputs the pushing gas corresponding to said required pressure by controlling the pressure regulator valve according to the control signal.

In addition, the reciprocating concentration system 5 of FIG. 7 may further include the display device 29 shown in FIG. 4, and the display device is connected to the computing control device 50. The cooperation of the computing control device 50 and the display device may be the same as described with reference to FIG. 4, their descriptions are not repeated herein.

Figure 8:
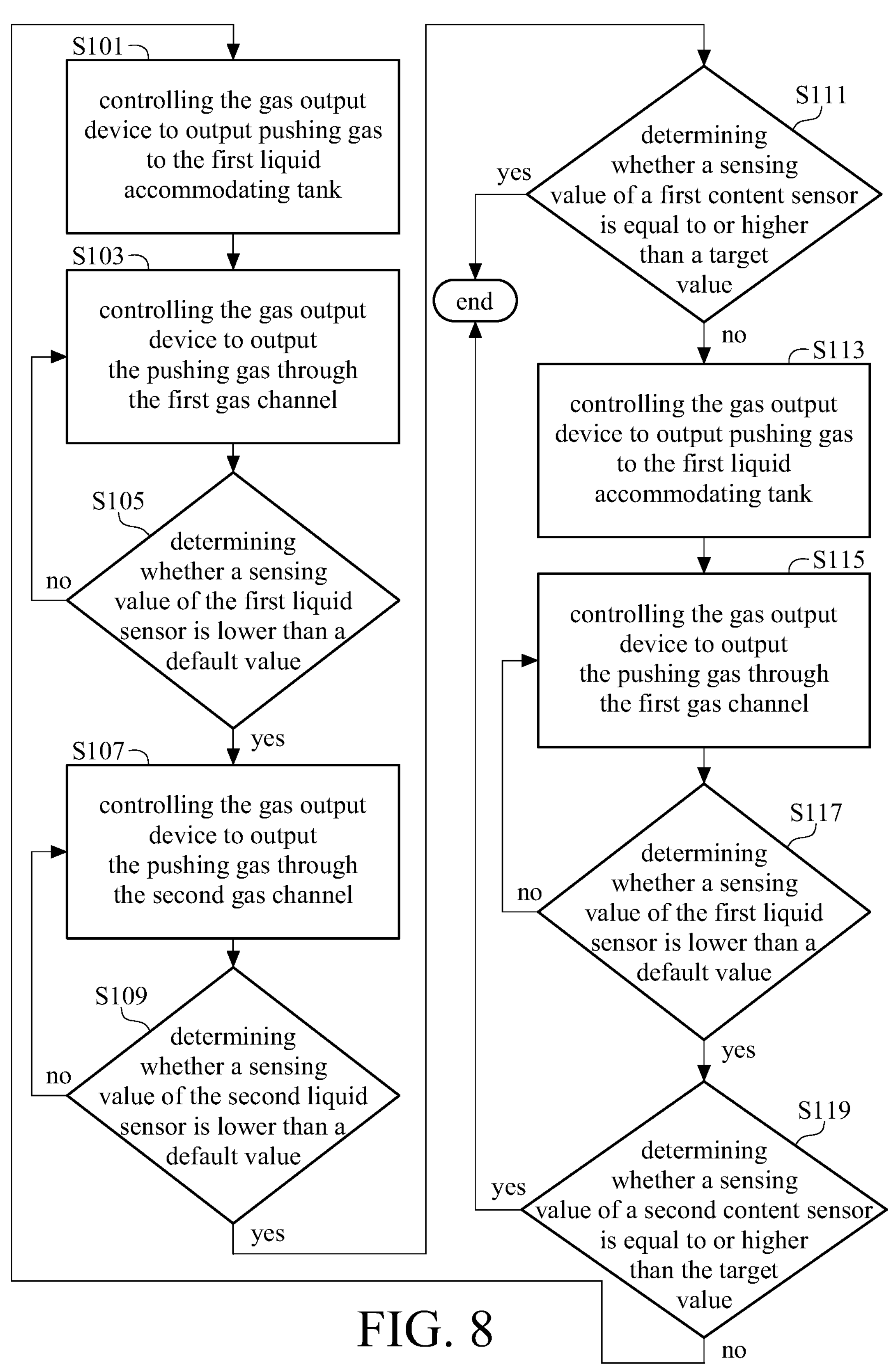
FIG. 8 is a flowchart illustrating an operation of the reciprocating concentration system.

Please refer to FIG. 7 and FIG. 8, wherein FIG. 8 is a flowchart illustrating an operation of the reciprocating concentration system, and is illustrated by using cell extraction for example. In step S101, the computing control device 50 controls the gas output device 51 to output the pushing gas to the first liquid storage tank 61. Specifically, the computing control device 50 may control the first valve V1 to make the gas output device 51 in communication with the second valve V2 through a gas channel therebetween, and control the second valve V2 to make the first valve V1 in communication with the first liquid storage tank 61 through a gas channel therebetween. At this time, the gas output device 51 is not in communication with the third valve V3, and the first valve V1 is not in communication with the second liquid storage tank 62.

The pushing gas output by the gas output device 51 enters the first liquid storage tank 61 through the third gas channel 503. When all the liquid in the first liquid storage tank 61 has entered the first liquid accommodating tank 52 and/or the weight of the first liquid accommodating tank 52 is equal to or higher than a default weight, the computing control device 50 controls the first valve V1 to not be in communication with the second valve V2, controls the first valve V1 to make the gas output device 51 in communication with the third valve V3 through a gas channel therebetween, controls the third valve V3 to make the first valve V1 in communication with the first liquid accommodating tank 52 through the first gas channel 501, and controls the third valve V3 to not be in communication with the second liquid accommodating tank 53. The computing control device 50 performs step S103 to control the gas output device 51 to output the pushing gas to the first liquid accommodating tank 52 through the first gas channel 501. At this time, the liquid in the first liquid accommodating tank 52 flows into the selection device 56 through the first liquid channel 511, and the selection device 56 outputs the concentrated liquid to the second liquid accommodating tank 53 through the second liquid channel 512. The computing control device 50 controls the first liquid sensor 54 to perform sensing and performs step S105.

When the computing control device 50 determines that the sensing value of the first liquid sensor 54 is not lower than the default value in step S105, it means that the liquid in the first liquid accommodating tank 52 has not yet been completely output. Therefore, the computing control device 50 perform step S103 again.

When the computing control device 50 determines that the sensing value of the first liquid sensor 54 is lower than the default value, it means that the liquid in the first liquid accommodating tank 52 may have been completely output. The computing control device 50 continues to control the first valve V1 to make the gas output device 51 to be in communication with the third valve V3 through a gas channel therebetween, controls the third valve V3 to make the first valve V1 to be in communication with the second liquid accommodating tank 53 through the second gas channel 502 therebetween, and controls the third valve V3 to not be in communication with the first liquid accommodating tank 52. The computing control device 50 performs step S107 to control the gas output device 51 to output the pushing gas to the second liquid accommodating tank 53 through the second gas channel 502.

At this time, the liquid in the second liquid accommodating tank 53 flows into the selection device 56 through the second liquid channel 512, and the selection device 56 outputs the concentrated liquid to the first liquid accommodating tank 52 through the first liquid channel 511. The computing control device 50 controls the second liquid sensor 55 to perform sensing and performs step S109.

When the computing control device 50 determines that the sensing value of the second liquid sensor 55 is not lower than the default value in step S109, it means that the liquid in the second liquid accommodating tank 53 may have been completely output. Therefore, the computing control device 50 performs step S107 again.

When the computing control device 50 determines that the sensing value of the second liquid sensor 55 is lower than the default value, it means that the liquid in the second liquid accommodating tank 53 may have been completely output. The computing control device 50 performs step S111 to determine whether the sensing value of the first content sensor 58 is equal to or higher than the target value.

When the determination result of step S111 is "yes", it means that enough purified liquid is collected, and the operation of the reciprocating concentration system 5 may be ended. When the determination result of step S111 is "no", it means that not enough purified liquid is collected. Therefore, the computing control device 50 may then perform steps S113, S115 and S117, wherein the implementations of steps S113, S115 and S117 may be the same as the implementations of steps S101, S103 and S105, respectively, their descriptions are not repeated herein.

When the determination result of step S117 is "yes", the computing control device 50 determines whether the sensing value of the second content sensor 59 is equal to or higher than the target value in step S119. When the determination result of step S119 is "no", it means that not enough concentrated liquid is collected, and the computing control device 50 may then perform step S101. When the determination result of step S119 is "yes", it means that enough concentrated liquid is collected, and the operation of the reciprocating concentration system 5 may be ended.

It should be noted that when the sensing value of the first content sensor 58 is higher than the target value, it means that some liquid in the first liquid accommodating tank 52 might come from the un-concentrated liquid of the first liquid storage tank 61. Therefore, when the determination result of step S111 is that the sensing value of the first content sensor 58 is higher than the target value, the computing control device 50 may perform controlling the gas output device 51 to output the pushing gas through the first gas channel 501 again. Similarly, when the determination result of step S119 is that the sensing value of the second content sensor 59 is higher than the target value, the computing control device 50 may perform controlling the gas output device 51 to output the pushing gas through the second gas channel 502 again.

Further, after the process of FIG. 8 ends, if the concentrated liquid is stored in the second liquid accommodating tank 53, the computing control device 50 may control the first valve V1 to make the gas output device 51 in communication with the second valve V2 through a gas channel therebetween, control the second valve V2 to make the first valve V1 in communication with the second liquid storage tank 62 through the fourth gas channel 504 therebetween, and control the first valve V1 to not be in communication with the third valve V3. Accordingly, the computing control device 50 may control the gas output device 51 to output the pushing gas to the second liquid storage tank 62 through the fourth gas channel 504, so that the washing solution/buffer solution in the second liquid storage tank 62 flows into the second liquid accommodating tank 53. Similarly, after the process of FIG. 8 ends, if the concentrated liquid is stored in the first liquid accommodating tank 52, the computing control device 50 may store the washing solution/buffer solution in the first liquid storage tank 61. The detail operations of the first liquid storage tank 61 and the second liquid storage tank 62 may be the same as the first liquid storage tank 47 and the second liquid storage tank 48 of FIG. 6, their descriptions are not repeated herein.

Also, as described above, the third content sensor 60 may include the transmittance sensor, and the transmittance sensor may indicate a liquid level of the third liquid accommodating tank 57. When the liquid level is equal to or higher than a default level, it means that enough purified liquid is collected in the third liquid accommodating tank 57. The reciprocating concentration system 5 may use the third liquid accommodating tank 57 and the third content sensor 60 to purify liquid in the first liquid accommodating tank 52/the second liquid accommodating tank 53 (i.e. purifying liquid coming from the first liquid storage tank 61), their detail operations may be the same as the third liquid accommodating tank 37 and the content sensor 38 of FIG. 5, their descriptions are not repeated herein.

In the reciprocating concentration system according to one or more embodiments described above, a gas pressure sensor may be disposed in the liquid accommodating tank, and the gas pressure sensor may be connected to the computing control device. The computing control device may monitor the pressure of the pushing gas entering the liquid accommodating tank according to the sensing value of the gas pressure sensor.

Figure 9:
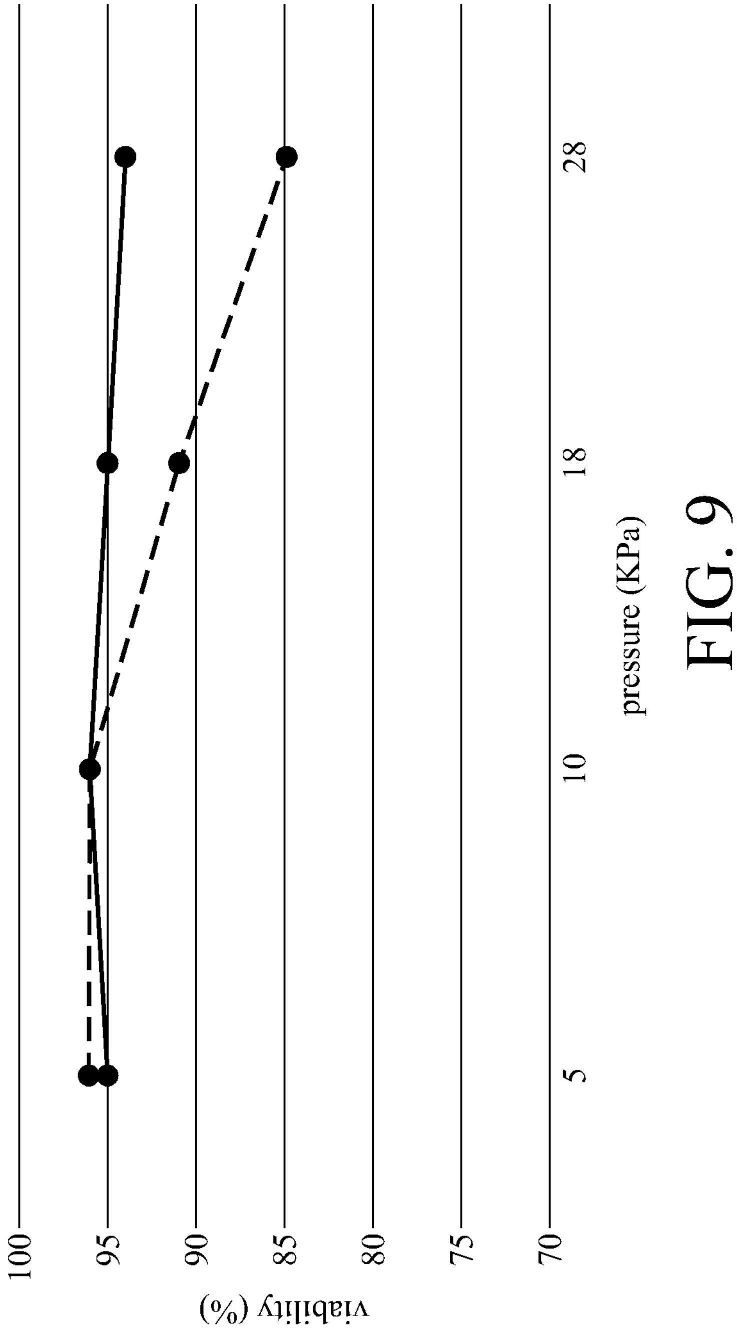
FIG. 9 is a graph showing the cell viability obtained by applying a peristaltic pump and the reciprocating concentration system of the present disclosure on cell extraction, respectively.

Please refer to FIG. 9, wherein FIG. 9 is a graph showing the cell viability obtained by applying a peristaltic pump and the reciprocating concentration system of the present disclosure on cell extraction, respectively. The solid line is used to represent the cell viability of applying the reciprocating concentration system of the present disclosure on cell extraction, and the dotted line is used to represent the cell viability of applying the peristaltic pump on cell extraction. As shown by the solid line in FIG. 9, as the pressure output by the gas output device gets higher, the corresponding cell viability does not decrease significantly. On the contrary, as shown by the dotted line in FIG. 9, as the pressure output by the peristaltic pump gets higher, the corresponding cell viability significantly decreases. Therefore, as can be seen from FIG. 9, the reciprocating concentration system of the present disclosure may reduce the shearing force and damage to fragile filtration target. Further, through the reciprocating concentration system of the present disclosure, the cell viability may be higher than 90%, cell recovery rate may be higher than 80%, and concentration accuracy may be equal to or lower than 5%.

What is claimed is:

1. A reciprocating concentration system, comprising:
- a gas output device controlled to output pushing gas through a first gas channel or a second gas channel;
- a first liquid accommodating tank in communication with the first gas channel;
- a second liquid accommodating tank in communication with the second gas channel;
- a selection device in communication with the first liquid accommodating tank through a first liquid channel and in communication with the second liquid accommodating tank through a second liquid channel, and having a filtered liquid outlet;
- a first liquid sensor disposed at the first liquid channel;
- a second liquid sensor disposed at the second liquid channel; and
- a computing control device connected to the gas output device, the first liquid sensor and the second liquid sensor.

2. The reciprocating concentration system according to claim 1, wherein the computing control device is configured to control the gas output device to output the pushing gas through one of the first gas channel and the second gas channel, obtain a sensing value of a corresponding one of the first liquid sensor and the second liquid sensor, and control the gas output device to output the pushing gas through another one of the first gas channel and the second gas channel when the sensing value decreases to a default value.

3. The reciprocating concentration system according to claim 1, further comprising:
- a content sensor disposed at the first liquid accommodating tank or the second liquid accommodating tank and connected to the computing control device.

4. The reciprocating concentration system according to claim 3, wherein the computing control device is configured to control the gas output device to stop outputting the pushing gas when a sensing value of the content sensor is equal to or higher than a target value.

5. The reciprocating concentration system according to claim 4, wherein the computing control device is further configured to output a channel switching signal to the gas output device when the sensing value of the content sensor is lower than a lower limit, wherein the lower limit is greater than 0.

6. The reciprocating concentration system according to claim 1, further comprising:
- a third liquid accommodating tank disposed at the filtered liquid outlet.

7. The reciprocating concentration system according to claim 6, further comprising:
- a weight sensor disposed at the third liquid accommodating tank and connected to the computing control device.

8. The reciprocating concentration system according to claim 7, wherein the computing control device is configured to control the gas output device to stop outputting the pushing gas when a sensing value of the weight sensor is higher than a target value.

9. The reciprocating concentration system according to claim 7, further comprising:
- a transmittance sensor disposed at the third liquid accommodating tank and connected to the computing control device.

10. The reciprocating concentration system according to claim 9, wherein the computing control device is configured to control the gas output device to stop outputting the pushing gas when a sensing value of the weight sensor is higher than a first target value and a sensing value of the transmittance sensor is higher than a second target value.

11. The reciprocating concentration system according to claim 7, further comprising:
- a concentration sensor disposed at the third liquid accommodating tank and connected to the computing control device.

12. The reciprocating concentration system according to claim 11, wherein the computing control device is configured to control the gas output device to stop outputting the pushing gas when a sensing value of the weight sensor is higher than a first target value and a sensing value of the concentration sensor is lower than a second target value.

13. The reciprocating concentration system according to claim 1, wherein the selection device further has a first outlet in communication with the first liquid channel and a second outlet in communication with the second liquid channel, a pore size of the first outlet and a pore size of the second outlet are not smaller than a diameter of a filtration target, and a pore size of the filtered liquid outlet is smaller than the diameter of the filtration target.

14. The reciprocating concentration system according to claim 1, wherein the gas output device is further controlled to output the pushing gas through a third gas channel, and the reciprocating concentration system further comprises:
- a liquid storage tank in communication with the third gas channel, and in communication with the liquid accommodating tank or the second liquid accommodating tank.

15. The reciprocating concentration system according to claim 1, wherein the selection device comprises a hollow fiber tube.

16. The reciprocating concentration system according to claim 15, wherein the hollow fiber tube comprises:
- a shell; and
- a plurality of hollow fiber membranes located inside the shell.

17. The reciprocating concentration system according to claim 1, further comprising:
- a display device connected to the computing control device.

18. The reciprocating concentration system according to claim 17, wherein the computing control device is configured to control the display device to display a replacement notification corresponding to the selection device when a filtration rate indicated by a plurality of sensing values of at least one of the first liquid sensor and the second liquid sensor is lower than a default rate.

* * * * *